(12) United States Patent
Kasher

(10) Patent No.: US 8,711,760 B2
(45) Date of Patent: Apr. 29, 2014

(54) METHOD AND APPARATUS TO ADJUST RECEIVED SIGNAL

(75) Inventor: Assaf Kasher, Haifa (IL)

(73) Assignee: Intel Corporation, Santa Clara, CA (US)

( * ) Notice: Subject to any disclaimer, the term of this patent is extended or adjusted under 35 U.S.C. 154(b) by 900 days.

(21) Appl. No.: 12/732,459

(22) Filed: Mar. 26, 2010

(65) Prior Publication Data

US 2011/0235622 A1  Sep. 29, 2011

(51) Int. Cl.
*H04B 7/185* (2006.01)
*H04L 1/00* (2006.01)
*H04L 25/03* (2006.01)
*H04W 52/24* (2009.01)
*H04W 52/22* (2009.01)

(52) U.S. Cl.
CPC ..... *H04L 1/0026* (2013.01); *H04L 2025/03426* (2013.01); *H04L 25/03343* (2013.01); *H04W 52/241* (2013.01); *H04W 52/226* (2013.01)
USPC ........ 370/317; 370/332; 455/101; 455/114.3; 455/115.1; 455/115.4; 455/522; 455/63.1; 455/67.13

(58) Field of Classification Search
None
See application file for complete search history.

(56) References Cited

U.S. PATENT DOCUMENTS

| | | | | |
|---|---|---|---|---|
| 5,596,570 | A * | 1/1997 | Soliman | 370/252 |
| 6,222,878 | B1 * | 4/2001 | McCallister et al. | 375/225 |
| 6,421,379 | B1 * | 7/2002 | Vannatta et al. | 375/229 |
| 6,882,217 | B1 * | 4/2005 | Mueller | 330/2 |
| 6,922,549 | B2 * | 7/2005 | Lyons et al. | 455/67.13 |
| 7,058,369 | B1 * | 6/2006 | Wright et al. | 455/114.2 |
| 7,295,614 | B1 * | 11/2007 | Shen et al. | 375/240.25 |
| 7,397,758 | B1 * | 7/2008 | Hart et al. | 370/208 |
| 7,502,420 | B2 * | 3/2009 | Ketchum | 375/267 |
| 7,593,699 | B2 * | 9/2009 | Duperray | 455/114.2 |
| 7,801,228 | B2 * | 9/2010 | Lehne et al. | 375/260 |
| 7,821,915 | B2 * | 10/2010 | Hart et al. | 370/208 |
| 7,944,991 | B2 * | 5/2011 | Zhao et al. | 375/296 |
| 8,144,722 | B2 * | 3/2012 | Lee et al. | 370/438 |
| 2002/0004369 | A1 * | 1/2002 | Kelly et al. | 455/12.1 |
| 2002/0072346 | A1 * | 6/2002 | Kato et al. | 455/403 |
| 2002/0097810 | A1 * | 7/2002 | Seki | 375/295 |
| 2002/0150170 | A1 * | 10/2002 | Citta et al. | 375/295 |
| 2002/0168020 | A1 * | 11/2002 | Justice et al. | 375/295 |

(Continued)

FOREIGN PATENT DOCUMENTS

CN  1875644 A  12/2006
CN  1933473 A  3/2007

(Continued)

OTHER PUBLICATIONS

Office Action for Japanese Patent Application No. 2011-034593, Mailed on Sep. 11, 2012, 4 pages of Office Action including 2 pages of English Translation.

(Continued)

*Primary Examiner* — Ian N Moore
*Assistant Examiner* — Dung B Huynh
(74) *Attorney, Agent, or Firm* — Shichrur & Co.

(57) ABSTRACT

A wireless communication device, a wireless communication system and a method to adjust transmitted signals constellation in a maximum likelihood multiple-input-multiple-output receiver by transmitting an EVM deviation value. The EVM deviation value may be added to a pre-stored error value at the receiver.

19 Claims, 2 Drawing Sheets

(56) References Cited

U.S. PATENT DOCUMENTS

| | | | |
|---|---|---|---|
| 2003/0003882 A1* | 1/2003 | Samuels et al. | 455/108 |
| 2003/0076874 A1* | 4/2003 | Li et al. | 375/145 |
| 2003/0084295 A1* | 5/2003 | Xie et al. | 713/170 |
| 2003/0099316 A1* | 5/2003 | Citta et al. | 375/350 |
| 2003/0165205 A1* | 9/2003 | Chu et al. | 375/346 |
| 2003/0176984 A1* | 9/2003 | Owen et al. | 702/124 |
| 2003/0206600 A1* | 11/2003 | Vankka | 375/261 |
| 2004/0014443 A1* | 1/2004 | Nakao et al. | 455/130 |
| 2004/0081193 A1* | 4/2004 | Forest et al. | 370/458 |
| 2004/0137856 A1* | 7/2004 | Kanazawa et al. | 455/91 |
| 2004/0218568 A1* | 11/2004 | Goodall et al. | 370/332 |
| 2005/0003848 A1* | 1/2005 | Chen et al. | 455/522 |
| 2005/0052990 A1* | 3/2005 | Lomnitz | 370/208 |
| 2005/0053033 A1* | 3/2005 | Kelly et al. | 370/329 |
| 2005/0059360 A1* | 3/2005 | Kenington | 455/91 |
| 2005/0114711 A1* | 5/2005 | Hesselink et al. | 713/201 |
| 2005/0195744 A1 | 9/2005 | Ryan et al. | |
| 2005/0220209 A1* | 10/2005 | Lewis | 375/267 |
| 2006/0117138 A1* | 6/2006 | Suzuki et al. | 711/114 |
| 2006/0154622 A1* | 7/2006 | Piirainen | 455/115.1 |
| 2006/0183432 A1* | 8/2006 | Breslin et al. | 455/69 |
| 2006/0209866 A1* | 9/2006 | Steenkiste et al. | 370/419 |
| 2006/0227909 A1* | 10/2006 | Thomas et al. | 375/346 |
| 2007/0009021 A1* | 1/2007 | Olgaard | 375/224 |
| 2007/0030915 A1* | 2/2007 | Bhukania et al. | 375/261 |
| 2007/0063886 A1* | 3/2007 | Brumley et al. | 342/13 |
| 2007/0070881 A1* | 3/2007 | Olgaard et al. | 370/208 |
| 2007/0109046 A1 | 5/2007 | Duperray | |
| 2007/0147692 A1* | 6/2007 | Dwyer et al. | 382/233 |
| 2007/0201575 A1* | 8/2007 | Ariyavisitakul et al. | 375/267 |
| 2007/0206695 A1 | 9/2007 | Ye et al. | |
| 2007/0226289 A1* | 9/2007 | Yoshizawa et al. | 708/530 |
| 2007/0242894 A1* | 10/2007 | Kautzer et al. | 382/243 |
| 2007/0254592 A1* | 11/2007 | McCallister et al. | 455/67.11 |
| 2008/0007346 A1* | 1/2008 | Jensen et al. | 331/16 |
| 2008/0019433 A1* | 1/2008 | Yamanouchi et al. | 375/267 |
| 2008/0019453 A1* | 1/2008 | Zhao et al. | 375/260 |
| 2008/0069195 A1* | 3/2008 | Amos | 375/228 |
| 2008/0074209 A1* | 3/2008 | Ceylan et al. | 332/144 |
| 2008/0101281 A1* | 5/2008 | Harris et al. | 370/328 |
| 2008/0112510 A1* | 5/2008 | Nakao et al. | 375/320 |
| 2008/0120529 A1* | 5/2008 | Sugiura et al. | 714/780 |
| 2008/0125045 A1 | 5/2008 | Nakao | |
| 2008/0137562 A1* | 6/2008 | Li et al. | 370/280 |
| 2008/0155373 A1* | 6/2008 | Friedman et al. | 714/752 |
| 2008/0187072 A1* | 8/2008 | Schell et al. | 375/296 |
| 2008/0232497 A1* | 9/2008 | Hart et al. | 375/260 |
| 2008/0317165 A1* | 12/2008 | Bagheri et al. | 375/296 |
| 2009/0034599 A1* | 2/2009 | Jungerman | 375/228 |
| 2009/0097581 A1* | 4/2009 | McCallister et al. | 375/260 |
| 2009/0129257 A1* | 5/2009 | Maltsev et al. | 370/208 |
| 2009/0232101 A1* | 9/2009 | Papasakellariou et al. | 370/335 |
| 2009/0296664 A1* | 12/2009 | Kolze | 370/335 |
| 2009/0316826 A1* | 12/2009 | Koren et al. | 375/296 |
| 2009/0318100 A1* | 12/2009 | Pan | 455/127.1 |
| 2010/0172398 A1* | 7/2010 | Sekino | 375/221 |
| 2010/0177833 A1* | 7/2010 | Mueller | 375/260 |
| 2010/0183088 A1* | 7/2010 | Inanoglu | 375/267 |
| 2010/0195817 A1* | 8/2010 | Cendrillon et al. | 379/406.06 |
| 2010/0202301 A1* | 8/2010 | Wen et al. | 370/252 |
| 2010/0208853 A1* | 8/2010 | Qian et al. | 375/346 |
| 2010/0232413 A1* | 9/2010 | Dakshinamurthy et al. | 370/343 |
| 2011/0110409 A1* | 5/2011 | Sands et al. | 375/222 |
| 2011/0159914 A1* | 6/2011 | Chen et al. | 455/522 |
| 2012/0169414 A1* | 7/2012 | Dupuy et al. | 327/552 |
| 2012/0176984 A1* | 7/2012 | Susitaival et al. | 370/329 |
| 2012/0195395 A1* | 8/2012 | Baldemair et al. | 375/296 |
| 2012/0207073 A1* | 8/2012 | Kim et al. | 370/311 |
| 2013/0034144 A1* | 2/2013 | Doherty et al. | 375/232 |

FOREIGN PATENT DOCUMENTS

| | | |
|---|---|---|
| JP | 2004-56499 A | 2/2004 |
| JP | 2007-510358 A | 4/2007 |
| JP | 2008-109300 A | 5/2008 |
| JP | 2010-98379 A | 4/2010 |
| JP | 2010-232934 A | 10/2010 |
| JP | 2011229124 A * | 11/2011 |
| WO | 2005/046267 A1 | 5/2005 |

OTHER PUBLICATIONS

International Preliminary Report on Patentability for PCT/US2011/030117 mailed on Oct. 11, 2012, 7 pages.

International Search Report and Written Opinion received for PCT Patent Application No. PCT/US2011/030117, mailed on Dec. 26, 2011, 9 pages.

"Draft Standard for Information Technology—Telecommunications and information exchange between systems—Local and metropolitan area networks—Specific requirements", IEEE P802.11n/D11.0, Jun. 2009.

Soo-hwan Kim et al. "Adaptive RF front end for low power consumption digital terrestrial television broadcasting receiver", IEICE Tech. Rep., vol. 106, No. 161, MoMuC2006-35, pp. 49-52, Jul. 2006.

Bo Goransson et al., "Effect of Transmitter and Receiver Impairments on the Performance of MIMO in HSDPA", Signal Processing Advances in Wireless Communications, 2008. SPAWC 2008., Sep. 7, 2008, pp. 496-500.

Office Action received for Chinese Patent Application No. 201110082172.4, mailed on Apr. 11, 2013, 18 pages of Office Action including 10 pages of English translation.

Office Action for Chinese Patent Application No. 201110082172.4, mailed on Oct. 10, 2013, 10 pages, including 6 pages of English translation.

* cited by examiner

METHOD AND APPARATUS TO ADJUST RECEIVED SIGNAL

BACKGROUND OF THE INVENTION

Wireless local area network (WLAN) devices may include a Multiple-Input-Multiple-Output (MIMO) transmitter receiver system. A Maximum Likelihood (ML) MIMO receiver may not know the transmitter Error Vector Magnitude (EVM). This may result degradation at the performance of the ML receiver, at least but not limited to, the 3×3 and higher MIMO modulations.

A problem with a MIMO communication may be as follows (the following is a simplified model): a transmitter of the MIMO may transmit a vector x. Each element in the vector is a member of a set of a (linear) digital modulation such as, for example a Binary Phase Shift Keying (BPSK), Quadrature Phase Shift Keying (QPSK), 16-Quadrature amplitude modulation (QAM), 64-QAM or the like.

A receiver of the MIMO is able to receive a set of receive channels y. The transmitted vector x passes through a matrix representing a channel H. The matrix H includes a plurality of rows k and a plurality of columns l. Each element in the row k and the column l represents the channel between the l'th transmit antenna to the k'th receive chain.

At the receiver, Gaussian noise n is added to the received signal. The mathematical model is therefore y=Hx+n. A Maximum Likelihood receiver tries to find a transmitted constellation point to generate the highest likelihood for the receive signal:

$$\hat{x} = \arg_x \min \frac{1}{(2\pi)^{k/2} \sigma^k} \exp\left(\frac{1}{2\sigma^2}(y-Hx)^H(y-Hx)\right).$$

This is equivalent to $\hat{x} = \arg_x \min \|y-Hx\|$.

The model described above ignores the transmitter noise which is mostly generated from phase noise and power amplifier non-linearity. The disregard for the transmitter noise may cause the ML receiver to place the transmitted constellation point on an error constellation point of a constellation diagram.

The received signal is depicted as $y=H(x+n_T)+n_R$. The noise at the receiver is colored and the maximum likelihood search is depicted as $$\hat{x} = \arg_x \min \frac{1}{(2\pi)^{k/2} |R_n|^{1/2}} \exp\left(-\frac{1}{2}(y-Hx)^H R_n^{-1}(y-Hx)\right).$$

Where $R_n$ is the combined noise covariance matrix at the ML receiver (for example Gaussian noise of the transmitter). $R_n = \sigma_R^2 I + \sigma_T^2 HH^H$ where, $\sigma_R^2$ is the noise variance at each of the receiver chains, as measured at the receiver and $\sigma_T^2$ is the transmitter noise variance, as measured at the transmitter antenna ports. While H is estimated during packet preamble analysis at the ML receiver, the ratio between $\sigma_R^2$ and $\sigma_T^2$ is not known to the ML receiver and may impair the ML receiver performance. Thus, there is a need to mitigate the above described problems.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
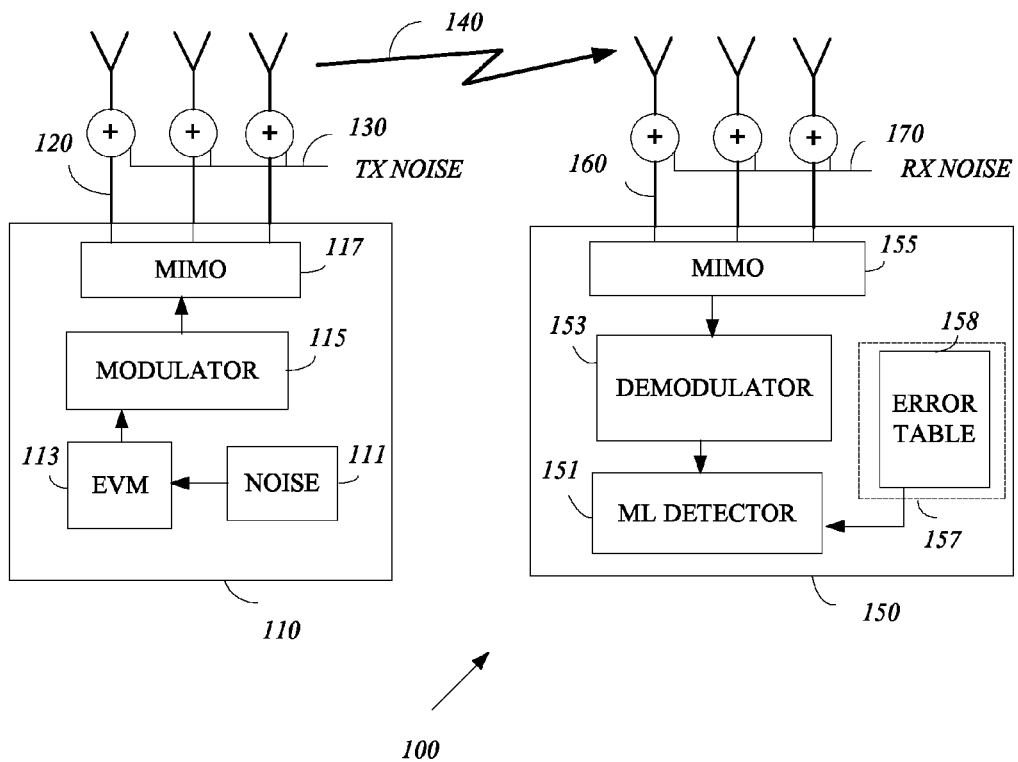
FIG. 1 is a schematic illustration of a wireless communication system according to exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, or transmission devices. The terms "a" or "an", as used herein, are defined as one, or more then one. The term plurality, as used herein, is defined as two, or more than two. The term another, as used herein is defined as at least a second or more. The terms including and/or having, as used herein, are defined as, but not limited to, comprising. The term operably coupled, is defined as operably connected in any desired form for example, mechanically, electronically, digitally, directly, by software, by hardware and the like.

According to embodiments of the present invention, the term EVM (which may be also called receive/transmit constellation error (RCE)) may be defined as a measure used to quantify the performance of the transmitter and/or receiver. The EVM measure may provide an indication of how far transmitter constellation points are from the ideal locations when representing a transmit signal without noise and/or distortion. An ideal transmitter EVM may be measured at the factory and may be stored in a memory for use with embodiment of the invention.

An error vector is a vector in the In-phase-Quadrature-phase (I-Q) plane between the ideal constellation point and the point received by the receiver. In other words, it is the difference between actual received symbols and ideal symbols. The average power of the error vector, normalized to signal power, is the EVM.

Furthermore, EVM, as defined for multi carrier modulations, is a ratio of two mean powers and is insensitive to the constellation geometry. In this form, the EVM may be related to modulation error ratio, the ratio of mean signal power to mean error power.

A constellation diagram is a representation of a signal modulated by a digital modulation scheme such as, for example a quadrature amplitude modulation, a phase-shift keying or the like. The constellation diagram may display the transmitted signal as a two-dimensional scatter diagram in the complex plane at symbol sampling instants. In some the embodiments of the invention, constellation diagrams may be used to recognize the type of interference and distortion in the transmitter signal, if desired.

For example, maximum likelihood detection upon reception of the transmitted signals may be used. For example, a demodulator may examine a received symbol, which may have been corrupted by a channel and/or a receiver noise. The corruption may be caused, for example, by an additive white Gaussian noise, a distortion, a phase noise an interference or the like. The demodulator may estimate a point on the constellation diagram which is closest to that of the received symbol in order to detect what was actually transmitted. Thus, according to one embodiment of the invention, the receiver may adjust the received signal according to the transmitter EVM deviation value, if desired.

For the purpose of analyzing received signal quality, some types of corruption are evident in the constellation diagram. For example, a Gaussian noise is shown as fuzzy constellation points, a Non-coherent single frequency interference is shown as circular constellation points, a Phase noise is shown as rotationally spreading constellation points, although the scope of the present invention is not limited in this respect.

It should be understood that embodiments of the present invention may be used in a variety of applications. Although the present invention is not limited in this respect, the circuits and techniques disclosed herein may be used in many apparatuses such as stations of a radio system. Stations intended to be included within the scope of the present invention include, by way of example only, wireless local area network (WLAN) stations, wireless personal network (WPAN), and the like.

Types of WLAN stations intended to be within the scope of the present invention include, although are not limited to, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Turning first to FIG. 1, a schematic illustration of a wireless communication system 100, according to exemplary embodiments of the invention is shown. According to one example embodiment, wireless communication system 100 may employ a WLAN. WLAN 100 may operate according to the standard developing by the IEEE 802.11.ac or the like.

According to this exemplary embodiment of the invention, WLAN 100 may include, but is not limited to including, a multiple-input-multiple-output (MIMO) transmitter 110, and MIMO receiver 150. MIMO transmitter 110 may include noise estimator 111, an EVM deviation value generator 113, a modulator 115, a MIMO 117, antennas 120 which receive a transmitter noise 130. MIMO receiver 150 may include a maximum likelihood (ML) detector 151, a demodulator 157, a calibration error table 157, a MIMO 155, antennas 160 which may receive noise 170.

For example antennas 120 may include three (3) antennas and antennas 160 may include three (3) antennas. The antennas may be dipole antennas, internal antennas, Yagi antennas, an antenna array or the like.

According to one embodiment of the invention, MIMO transmitter 110 may estimate a transition noise (e.g., TX noise 130) by noise estimator 111. EVM deviation value generator 113 may calculate an EVM deviation value by, for example, submitting the noise estimate from a pre-stored noise measure. For example, the pre-stored noise measurement may be stored in a table similar to error table 158 (not shown), if desired. Furthermore, EVM deviation value generator 113 may generate a frame and/or data packets which include the EVM deviation value.

According to exemplary embodiments of the invention, modulator 115 may be an Orthogonal Frequency Division Multiplexing (OFDM) modulator and/or Orthogonal Frequency Division Multiple Access (OFDMA) modulator or the like. Modulator 115 may modulate the data packet to a transmission vector x wherein each element in the vector x be a member of a set of a (linear) digital modulation such as, for example, a BPSK, QPSK, 16-QAM, 64-QAM or the like. MIMO 117 may transmit the vector x by antennas 120 over channel H 140. The transmitted vector x may include transmit (TX) noise 130 and may depicted as x=x+$n_t$ wherein n depict the noise.

Although the scope of the present invention is not limited to this exemplary embodiment, antennas 160 may receive the transmitted signal with additional receive (RX) noise 170. The received signal may include at least the data packet which includes the EVM deviation value, if desired. The received signal may be depicted as y=Hx++H$n_t$+$n_r$, wherein H depicts the channel matrix, x is the transmitted signal $n_t$ is the transmitter noise and $n_r$ is the receiver noise. MIMO receivers 155 may receive the received signal. Demodulator 153 may demodulate the received signal and may provide symbols of the data packet.

According to embodiments of the present invention ML detector 151 may perform a maximum likelihood (ML) search on the received matrix according to $\hat{x}=\arg_x\min\|r-Hx\|^2$. For example the noise may be white noise and the noise covariance matrix may be $R_n=H^H H\sigma_t^2+H\sigma_r^2$. Thus, adding the noise to the ML search equation is depicted as $$\hat{x} = \arg_x\min\left\|R^{-\frac{1}{2}}r - R^{-\frac{1}{2}}Hx\right\|^2,$$

although the scope of the present invention is not limited in this respect.

ML detector 151 is operably coupled to memory 157 which may store exemplary table 1 below. According to this example, Table 1 may be presorted in memory 157 during a device calibration for example in a factory. Exemplary Table 1 shows the allowed relative constellation error versus constellation size and coding rate, if desired.

TABLE 1

| Modulation | Coding Rate | Relative constellation error (dB) |
|---|---|---|
| BPSK | ½ | −5 |
| QPSK | ½ | −10 |
| QPSK | ¾ | −13 |
| 16-QAM | ½ | −16 |
| 16-QAM | ¾ | −19 |
| 64-QAM | ⅔ | −22 |
| 64-QAM | ¾ | −25 |
| 64-QAM | ⅚ | −28 |
| 256-QAM | ⅔ | −28 |
| 256-QAM | ¾ | −31 |
| 256-QAM | ⅚ | −34 |

ML detector 151 may receive the EVM deviation value and may add it to the relative constellation error value stored in table 1, although the scope of the present invention is not limited to this example.

In order to estimate $R_n$, according to $R_n = H^H H \sigma_t^2 + H \sigma_r^2$, ML detector 151 may estimate $\sigma_T^2$ (e.g. transmitter noise) using the EVM, although the scope of the present invention is not limited to this example.

Figure 2:
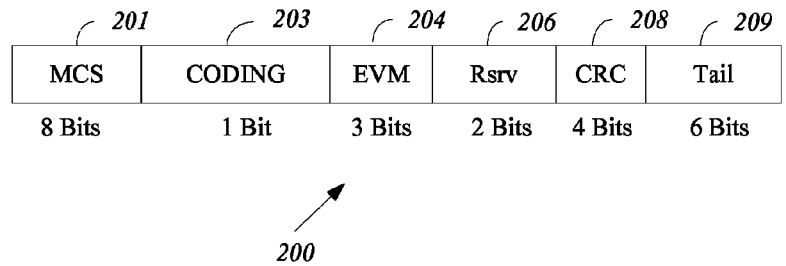
FIG. 2 is a schematic illustration of a packet according to exemplary embodiment of the invention.

Turning to FIG. 2, a schematic illustration of a frame 200 according to exemplary embodiment of the invention is shown. According to this example frame 200 may include Modulation and Coding Scheme (MCS) field 201 that include 8 bits, a coding field 203 that include 1 bit, an EVE field 204 which include the EVM deviation value of 3 bits, Reserve field 206, Cyclic Redundancy Check (CRC) field of 4 bits for checking errors in the frame and a tail field 209 of 6 bits, although it should be understood that this frame is an example only and other frames with other data may be used with embodiments of the invention.

Figure 3:
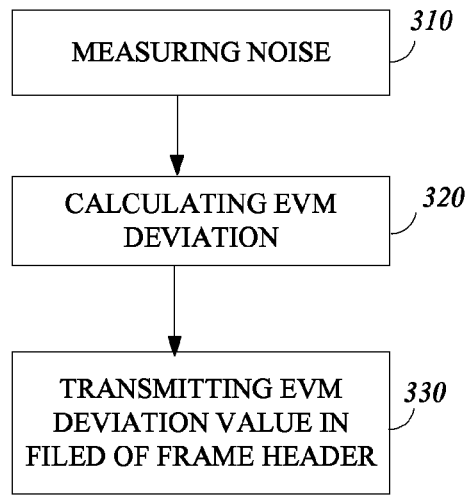
FIG. 3 is a flow chart of a method of transmitting EVM deviation value at a wireless communication device according to some embodiments of the present invention.

Turning to FIG. 3, a flow chart of a method of transmitting EVM deviation value at a wireless communication device according to some embodiments of the present invention is shown. According to this exemplary method a MIMO transmitter (e.g., transmitter 110) may measure a noise level value indicating a quality of the noise level. The transmitter may transmit the noise level value indicating a quality of the noise level in relation to a required noise level for a transmitted constellation of data streams. The MIMO transmitter may measure before each transmission a transmission noise (e.g., TX noise 130) as shown at text box 310. The transmitter may calculate EVM deviation value by, for example, comparing the measured noise to a stored noise values (text box 320), if desired. The transmitter may enter the calculated EVM deviation value to a frame field (e.g., EVM field 204) and transmitted the frame to a ML MIMO receiver e.g., receiver 150 (text box 330).

It should be understood that according to some embodiment of the invention the EVM deviation value is transmitted in each transmission to the ML MIMO receiver in order to correct error in the signal which caused by the noise and/or to filter the noise. According to embodiments of the invention the noise may be a white noise a Gaussian noise or the like.

Figure 4:
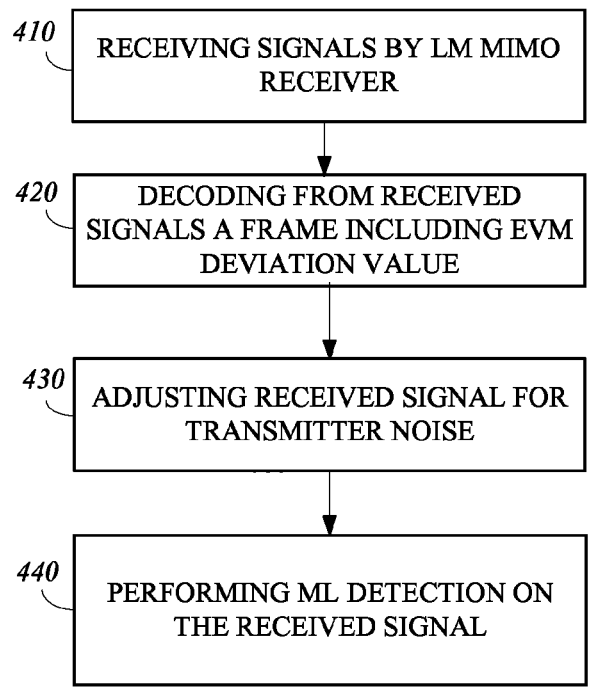
FIG. 4 is a flow chart of a method of receiving a constellation of data streams to some embodiments of the invention.

Turning to FIG. 4, a flow chart of a method of receiving a constellation of data streams to some embodiments of the invention is shown. The method starts with receiving signals using a LM MIMO receiver (text box 410). The signals may be OFDM signals and may include data packets which include frames. The ML MIMO receiver (e.g. receiver 150) may decode from the received signal the frame which include the EVM deviation value (text box 420). The ML MIMO decoder may adjust the received signals according to the transmitter EVM (text box 430) for example, by receiving a Modulation and Coding Scheme (MCS) (e.g., field 201) and adding the EVM deviation value to a pre-stored EVM value according to the MCS for placing a detected symbol on a desired constellation point, if desired.

In addition, the ML MIMO receiver may perform ML detection and/or search on the received frame in order to detect data symbols (text box 440). For example, the constellation point values and/or error values may be stored in a table such as, for example table 1 above. Advantageously, the result of the method is detection without errors the symbols of the received data packet which may enable the transmitter to transmit at a faster data rate and/or less robust modulation schemes, although other advantage may be achieved by using embodiment of the invention.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method comprising:
    estimating at a multiple-input-multiple-output (MIMO) transmitter a transmission noise level of said MIMO transmitter;
    calculating at said MIMO transmitter an error vector magnitude (EVM) deviation value by comparing the estimated transmission noise level of said MIMO transmitter to stored noise values; and
    transmitting a frame from said MIMO transmitter, wherein the frame includes a field including said EVM deviation value, said EVM deviation value indicating a quality of the estimated transmission noise level of said MIMO transmitter in relation to a predefined noise level for a transmitted constellation of data streams.

2. The method of claim 1 comprising measuring the noise level of said transmitter prior to a transmission by said MIMO transmitter.

3. A method of adjusting a received signal in a multiple-input-multiple-output receivers system, the method comprising:
    receiving from a transmitter a deviation of an error vector magnitude (EVM) value with a received data stream, the EVM deviation value indicating a quality of a transmission noise level of said transmitter in relation to a predefined noise level;
    detecting a symbol from the received data stream using a maximum likelihood detection scheme;
    adding the deviation EVM value to a pre-stored EVM value; and
    placing the symbol on a constellation point, based on a result of said adding.

4. The method of claim 3, wherein receiving comprises:
    receiving a frame that includes the deviation EVM value.

5. The method of claim 3 comprising:
    receiving a modulation coding scheme and adding the EVM deviation value to the pre-stored EVM value according to the modulation coding scheme.

6. The method of claim 3 comprising:
    adjusting the received signal for transmitter noise by adding the deviation EVM value to a pre-stored EVM value in order to place the symbol on a constellation point.

7. A wireless communication device comprising:
    a multiple-input-multiple-output (MIMO) receivers system to receive from a MIMO transmitter a deviation of an error vector magnitude (EVM) value with a received data stream, the EVM deviation value indicating a quality of a transmitter noise of said MIMO transmitter in relation to a predefined noise level;

a memory to store in a table a pre-stored EVM value; and a detector to detect a symbol from the received data stream using a maximum likelihood detection scheme, to adjust a received signal for the transmitter noise of said MIMO transmitter by adding the deviation EVM value to the pre-stored EVM value and to place the symbol on a constellation point.

8. The wireless communication device of claim 7, wherein the MIMO receivers system is able to receive a frame that includes the deviation EVM value.

9. The wireless communication device of claim 8, wherein the frame includes a modulation coding scheme and the detector is able to add the EVM deviation value to the pre-stored EVM value according to the modulation coding scheme.

10. The wireless communication device of claim 7, wherein the detector comprises a maximum likelihood detector.

11. A multiple-input-multiple-output (MIMO) transmitter comprising:

a noise estimator to estimate a transmission noise level of said MIMO transmitter; and an error vector magnitude (EVM) deviation value generator to calculate an EVM deviation value by comparing the estimated transmission noise level of said MIMO transmitter to stored noise values;

said MIMO transmitter to transmit a frame comprising a field including said EVM deviation value, said EVM deviation value indicating a quality of the estimated transmission noise level of said MIMO transmitter in relation to a predefined noise level for a transmitted constellation of data streams.

12. The MIMO transmitter of claim 11, wherein said noise estimator is to measure the transmission noise level of said MIMO transmitter prior to a transmission by said MIMO transmitter.

13. A wireless communication system comprising:

an antenna array operably coupled to a multiple-input-multiple-output (MIMO) receivers system to receive from a MIMO transmitter a deviation of an error vector magnitude (EVM) value with a received data stream, the EVM deviation value indicating a quality of a transmitter noise of said MIMO transmitter in relation to a predefined noise level; and a detector to detect a symbol from the received data stream using a maximum likelihood detection scheme, and to add the deviation EVM value to a pre-stored EVM value in order to place the symbol on a constellation point.

14. The wireless communication system of claim 13, wherein the MIMO receiver system is able to receive a frame that includes the deviation EVM value.

15. The wireless communication system of claim 14, wherein the frame includes a modulation coding scheme and the detector is able to add the EVM deviation value to the pre-stored EVM value according to the modulation coding scheme.

16. The wireless communication system of claim 14 comprising:

a memory to store in a table the pre stored EVM value, wherein the detector is able to adjust a received signal for said transmitter noise by adding the deviation EVM value to the pre-stored EVM value from the table in order to place the symbol on the constellation point.

17. The wireless communication system of claim 13, wherein the detector comprises a maximum likelihood detector.

18. The wireless communication system of claim 13, wherein the transmitter noise comprises white noise.

19. The wireless communication system of claim 13, wherein said wireless communication system is able to operate within a wireless local area network using Orthogonal Frequency-Division Multiplexing (OFDM) scheme.

\* \* \* \* \*

UNITED STATES PATENT AND TRADEMARK OFFICE
CERTIFICATE OF CORRECTION

PATENT NO. : 8,711,760 B2
APPLICATION NO. : 12/732459
DATED : April 29, 2014
INVENTOR(S) : Assaf Kasher Page 1 of 1

It is certified that error appears in the above-identified patent and that said Letters Patent is hereby corrected as shown below:

In the Claims

In column 8, line 21, In Claim 16, delete "claim 14" and insert -- claim 13 --, therefor.

Signed and Sealed this
Twenty-third Day of September, 2014

Michelle K. Lee
*Deputy Director of the United States Patent and Trademark Office*